US012589439B2

(12) United States Patent
Mikado et al.

(10) Patent No.: US 12,589,439 B2
(45) Date of Patent: Mar. 31, 2026

(54) TOOL HOLDER AND TOOL HOLDING STRUCTURE INCLUDING THE SAME

(71) Applicant: NIKKEN KOSAKUSHO WORKS, LTD., Osaka (JP)

(72) Inventors: Susumu Mikado, Osaka (JP); Eisaku Nakai, Osaka (JP); Stephen Eckersall, South Yorkshire (GB)

(73) Assignee: NIKKEN KOSAKUSHO WORKS, LTD., Osaka (JP)

( * ) Notice: Subject to any disclaimer, the term of this patent is extended or adjusted under 35 U.S.C. 154(b) by 58 days.

(21) Appl. No.: 18/594,380

(22) Filed: Mar. 4, 2024

(65) Prior Publication Data

US 2024/0335889 A1      Oct. 10, 2024

(30) Foreign Application Priority Data

Apr. 7, 2023      (JP) ................................. 2023-062605

(51) Int. Cl.
| | |
|---|---|
| *B23B 31/20* | (2006.01) |
| *B23B 31/00* | (2006.01) |
| *B23B 31/107* | (2006.01) |

(52) U.S. Cl.
CPC ............ *B23B 31/20* (2013.01); *B23B 31/005* (2013.01); *B23B 31/107* (2013.01)

(58) Field of Classification Search
CPC ............ B23B 31/202; B23B 31/10741; B23B 31/1072; B23B 31/208; B23B 31/20; B23B 2231/2005
See application file for complete search history.

(56) References Cited

U.S. PATENT DOCUMENTS

| | | | | | |
|---|---|---|---|---|---|
| 3,618,962 | A | * | 11/1971 | Cox | ...................... B23B 31/202 |
| | | | | | 279/97 |
| 3,830,135 | A | * | 8/1974 | Sullivan | ................ B23B 31/202 |
| | | | | | 409/234 |
| 4,133,545 | A | * | 1/1979 | Komori | ................. B23B 31/028 |
| | | | | | 279/156 |
| 4,166,711 | A | * | 9/1979 | Kress | ..................... B23D 77/00 |
| | | | | | 408/233 |
| 4,330,923 | A | * | 5/1982 | Cummings | ......... B23B 31/1072 |
| | | | | | 403/DIG. 7 |
| 4,377,292 | A | * | 3/1983 | Staron | ................. B23B 31/1072 |
| | | | | | 408/239 R |
| 4,437,801 | A | * | 3/1984 | Lewis | ............... B23B 31/10741 |
| | | | | | 409/234 |

(Continued)

FOREIGN PATENT DOCUMENTS

| | | | | |
|---|---|---|---|---|
| DE | 202015105500 | U1 | 1/2016 | |
| DE | 102014226648 | A1 * | 6/2016 | ............. B23B 31/02 |

(Continued)

OTHER PUBLICATIONS

Extended European Search Report issued in corresponding European Application No. 24161233.2, dated Aug. 20, 2024, pp. 1-8.

*Primary Examiner* — Nicole N Ramos
(74) *Attorney, Agent, or Firm* — HAUPTMAN HAM, LLP

(57)      ABSTRACT

A tool holder includes a holder body, a tapered collet, a first side lock bolt, a second side lock bolt, and a key. The key fits in a keyway of the collet, contacts the inner peripheral surface of a front hole, and contacts a recess formed in a rear end portion of a cutting tool inserted into a tool insertion hole of the collet.

8 Claims, 8 Drawing Sheets

(56) References Cited

U.S. PATENT DOCUMENTS

| | | | | |
|---|---|---|---|---|
| 4,971,491 | A | * | 11/1990 | Cook .................... B23P 11/027 |
| | | | | 408/1 BD |
| 7,077,608 | B2 | * | 7/2006 | Hartman ............... B23B 31/028 |
| | | | | 408/239 R |
| 9,238,269 | B2 | * | 1/2016 | Nakai ................... B23B 31/005 |
| 2009/0116912 | A1 | | 5/2009 | Jansen et al. |
| 2013/0328275 | A1 | * | 12/2013 | Haimer ................. B24B 45/006 |
| | | | | 269/54.3 |

FOREIGN PATENT DOCUMENTS

| | | | | | |
|---|---|---|---|---|---|
| DE | 102021110459 | A1 | * | 10/2022 | ............ B23B 31/02 |
| EP | 2832478 | A1 | | 2/2015 | |
| FR | 487904 | A | | 8/1918 | |
| JP | H02-003366 | Y | | 1/1990 | |
| KR | 20170092337 | A | * | 8/2017 | ............ B23B 31/02 |
| WO | 2014103350 | A1 | | 7/2014 | |

* cited by examiner (A)

(B)

(C)

(A)

(B)

(A)

(B)

| $d_1$ | $b_1$ | $e_1$ | $h_1$ | $l_1$ | | $d_1$ | $b_1$ | $e_1$ | $h_1$ | $l_1$ | $l_2$ |
|---|---|---|---|---|---|---|---|---|---|---|---|
| h6 | +0.05 0 | 0 −1 | h13 | +2 0 | | h6 | +0.05 0 | 0 −1 | h13 | +2 0 | +1 0 |
| 6 | 4.2 | 18 | 4.8 | 36 | | 25 | 12 | 32 | 23 | 56 | 17 |
| 8 | 5.5 | | 6.6 | | | 32 | 14 | 36 | 30 | 60 | 19 |
| 10 | 7 | 20 | 8.4 | 40 | | 40 | | 40 | 38 | 70 | |
| 12 | 8 | 22.5 | 10.4 | 45 | | 50 | 18 | 45 | 47.8 | 80 | 23 |
| 16 | 10 | 24 | 14.2 | 48 | | 63 | | 50 | 60.8 | 90 | |
| 20 | 11 | 25 | 18.2 | 50 | | | | | | | |

(A)

(B)

(C)

TOOL HOLDER AND TOOL HOLDING STRUCTURE INCLUDING THE SAME

BACKGROUND OF THE INVENTION

Field of the Invention

The present invention relates to tool holders and tool holding structures including the same.

Background Art

Conventionally, a collet is sometimes used to attach a cutting tool such as an endmill to a spindle of a machine tool. Known documents disclosing such a technique include, for example, Japanese Unexamined Utility Model Application Publication No. H02-3366 and WO2014/103350.

Japanese Unexamined Utility Model Publication No. H02-3366 discloses that a straight collet for gripping a cutting tool is fitted in a chuck tube, and a key protruding from an outer peripheral surface of the collet and a keyway formed on an inner peripheral surface of the chuck tube engage with each other to lock the cutting tool.

WO2014/103350 discloses that a shank of a cutting tool has an outer fitting portion in the form of a recess, a collet has a fitting hole, and a fitting member is fitted in the outer fitting portion and inserted into the fitting hole, so that the cutting tool can be prevented from rotating relative to a holder body and slipping out of the holder body.

SUMMARY OF INVENTION

The inventors found that there is still room for improvement in the conventional tool holders. Namely, in order to satisfy the recent demands for higher speed machine tools and higher precision machining, it is necessary to hold a cutting tool more stably.

The present invention was made to solve the above problem, and it is an object of the present invention to provide a tool holder that can stably hold a cooling tool and a tool holding structure including the same.

In order to achieve the above object, a tool holder according to an aspect of the present invention is a tool holder for fixing and grasping an additionally machined cutting tool, the additionally machined cutting tool being a cutting tool in which a side lock recess in a standard shank product of the cutting tool has been additionally machined so as to have a greater length in an axial direction and a greater depth toward a central axis and tolerances of the length in the axial direction and the depth toward the central axis have been reduced to very small values. The tool holder includes a holder body, a tapered collet, a first side lock bolt, a second side lock bolt, and a key. The holder body includes a rear hole, a middle hole, a front hole, a first through hole, and a second through hole, the rear hole extending from a rear end of the holder body forward in the axial direction, the middle hole being connected to a front end of the rear hole and extending forward in the axial direction, the front hole being a tapered hole connected to a front end of the middle hole and extending forward in the axial direction with an inner diameter of the tapered hole gradually increasing toward a distal end of the holder body, the first through hole extending perpendicularly to the axial direction from an outer peripheral surface of the holder body to an inner peripheral surface of the middle hole, and the second through hole being located at a different position in a circumferential direction from the first through hole and extending from the outer peripheral surface of the holder body to the inner peripheral surface of the middle hole so as to be tilted from front toward rear. The collet is detachably inserted into the middle hole and the front hole, includes a tool insertion hole in a distal end region of the collet, an outer diameter of an outer peripheral surface of the distal end region gradually increases toward a distal end of the collet. The collet includes a keyway, a first flat portion, and a second flat portion, the keyway extending from the outer peripheral surface of the tapered collet to the tool insertion hole, the first flat portion being a flat cut in the outer peripheral surface of the collet and located at a position facing the first through hole, and the second through hole being such a flat cut in the outer peripheral surface of the collet that is gradually away from an axis from front in the axial direction toward rear in the axial direction and being located at a position facing the second through hole. The first side lock bolt passes through the first through hole, and a distal end of the first side lock bolt contacts the first flat portion of the collet. The second side lock bolt passes through the second through hole, and a distal end of the second side lock bolt contacts the second flat portion of the collet. The key fits in the keyway of the collet, contacts an inner peripheral surface of the front hole, and contacts the side lock recess in a rear end portion of the additionally machined cutting tool inserted into the tool insertion hole.

Preferably, the collet includes a rear end region and a front end region with a middle in the axial direction of the collet as a boundary between the rear end region and the front end region, the rear end region being located on a rear end side, and the front end region being located on a front end side, and the keyway is located in the front end region.

Preferably, the collet includes a plurality of slits extending in the axial direction, and the keyway is located at an intermediate position in the axial direction of one of the slits.

Preferably, the keyway and the first flat portion of the collet are located at such positions that the keyway and the first flat portion overlap each other in the axial direction.

Preferably, the second side lock bolt includes a bolt body that passes through the second through hole and a contact portion that contacts the second flat portion of the collet, and the contact portion is provided in such a manner that an orientation of the contact portion is changeable according to an orientation of the second flat portion.

Preferably, the collet includes an engaging portion along a rear inner peripheral surface in the axial direction of the collet, the engaging portion being a portion that engages with a tensile bolt.

A tool holding structure according to another aspect of the present invention includes: the above tool holder; and the cutting tool that is inserted into the tool insertion hole of the collet. The cutting tool includes the side lock recess that is located at a position facing the keyway of the collet and into which the key fits.

Preferably, the tolerance of the length in the axial direction of the side lock recess is within a range of 0 to +0.005.

According to the present invention, it is possible to hold a cutting tool reliably and stably.

BRIEF DESCRIPTION OF DRAWINGS

FIG. 4(A) is a longitudinal section, FIG. 4(B) is a plan view, and FIG. 4(C) is a sectional view taken along line IV-IV in FIG. 4(A).

FIG. 5(A) is a side view and FIG. 5(B) is a front view.

FIG. 6(A) is a side view and FIG. 6(B) is a front view.

FIG. 7(A) shows side and plan views of a standard shank product, and FIG. 7(B) is a table of the standard.

FIG. 9(A) is a longitudinal section, FIG. 9(B) is a plan view, and FIG. 9(C) is a sectional view taken along line IX-IX in FIG. 9(A).

DESCRIPTION OF EMBODIMENTS

Figure 1:
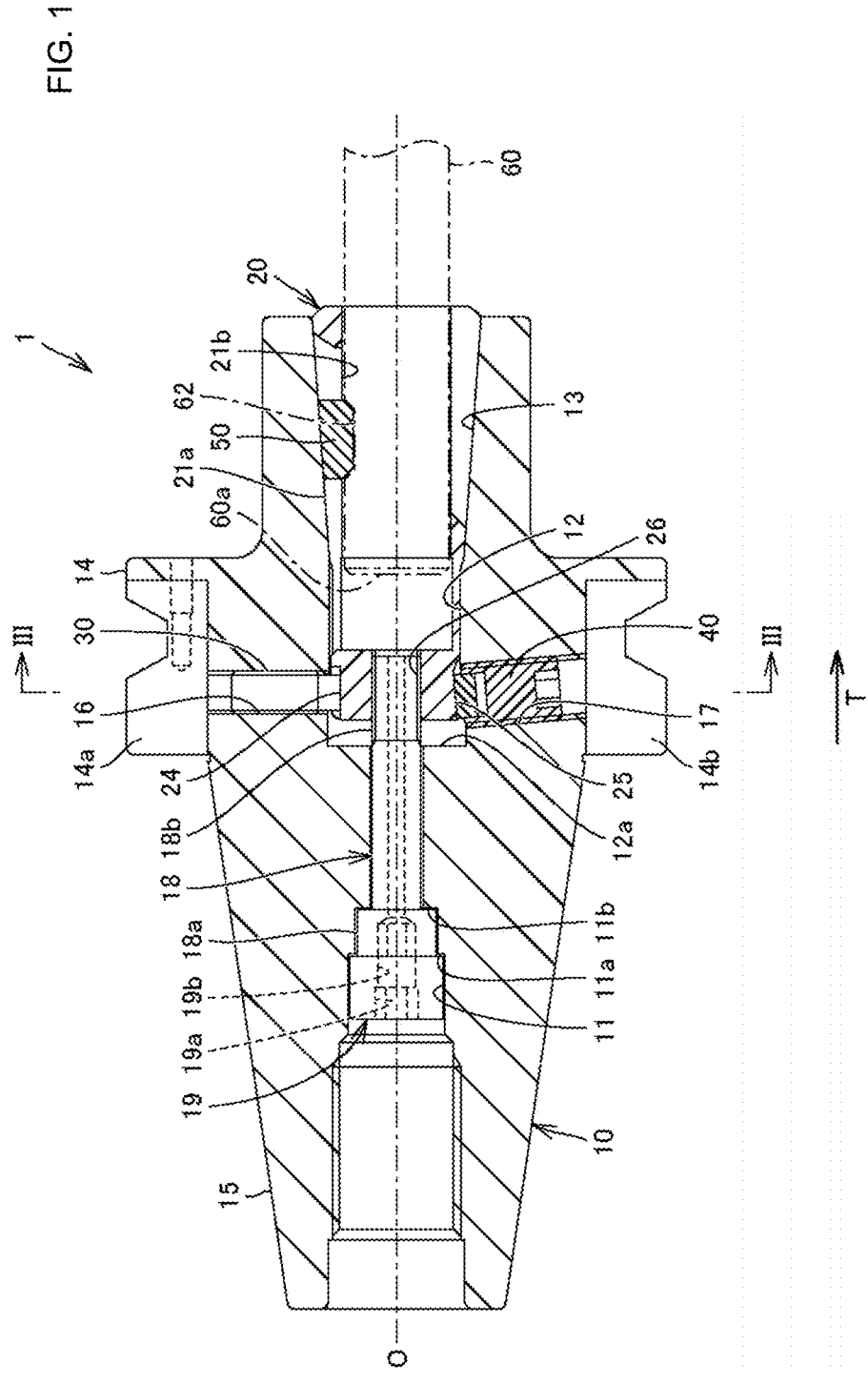
FIG. 1 is a side view of a tool holder according to a first embodiment of the present invention.

Embodiments of the present invention will be described in detail with reference to the drawings. The same or corresponding portions are denoted by the same reference characters throughout the drawings, and description thereof will not be repeated.

First Embodiment

Figures 2, 3:
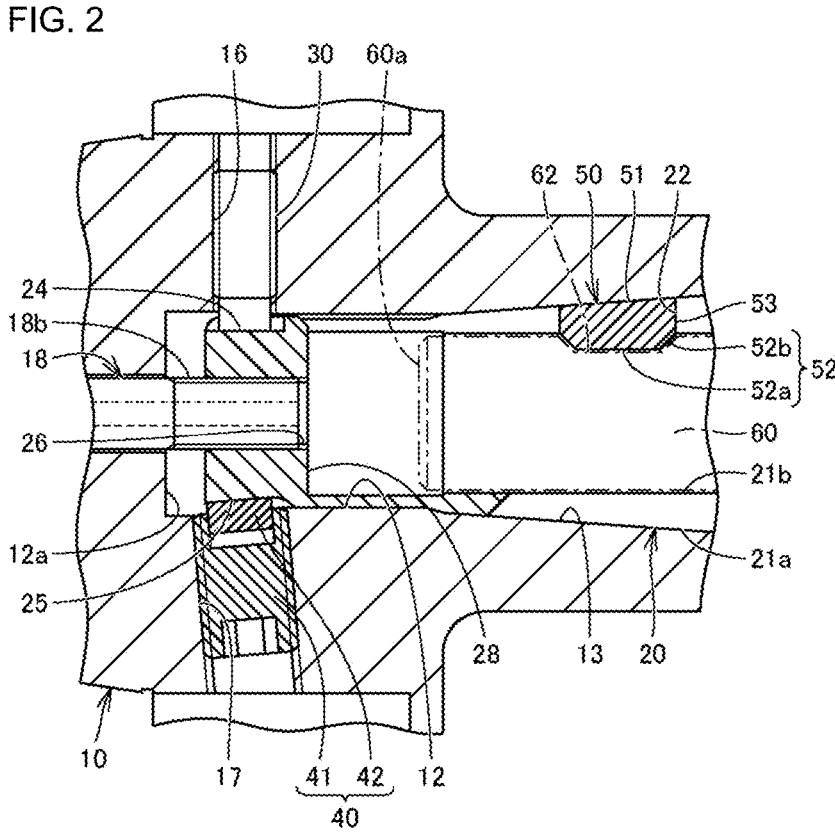
FIG. 2 is a partial enlarged view of FIG. 1.
FIG. 3 is a sectional view taken along line III-III in FIG. 1.
Figure 4:
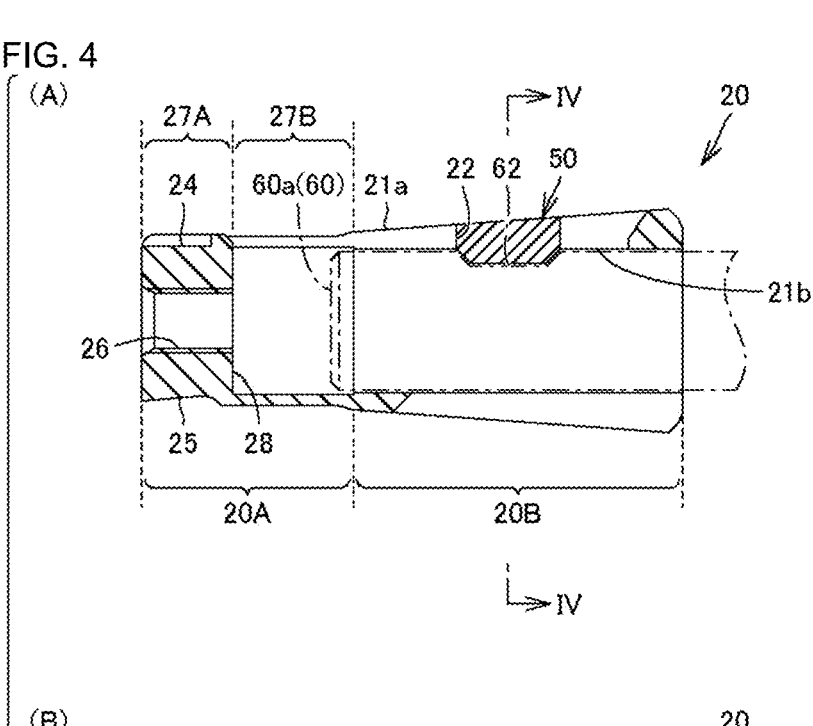
FIG. 4 shows a collet alone, where
Figure 4:
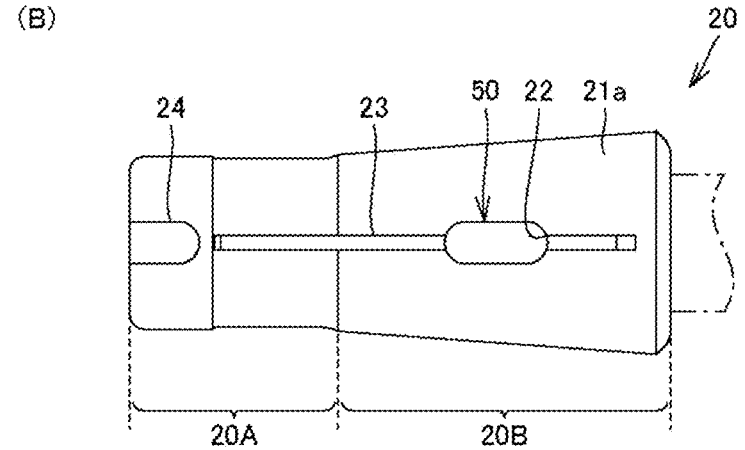
Figure 4:
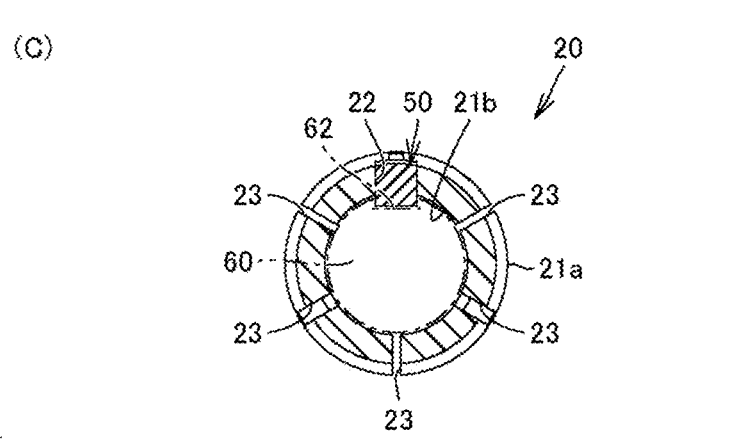

A tool holder according to a first embodiment of the present invention will be described with reference to FIGS. 1 to 7. In FIG. 1, a long dashed short dashed line O represents an axis, an arrow T indicates the front side in the axial direction (also referred to as "distal end side"), and the opposite direction to the arrow T indicates the rear side in the axial direction (also referred to as "rear end side"). FIG. 3 is a sectional view taken along line III-III in FIG. 1.

As shown particularly in FIG. 1, a tool holder 1 according to the present embodiment is a chuck that holds a cutting tool 60 such as an endmill or a reamer, and is attached to a spindle of a machine tool. The tool holder 1 includes, as its main components, a holder body 10 and a collet 20 attached to the distal end side in the axial direction of the holder body 10. The tool holder 1 in the form of an assembly of the holder body 10 and the collet 20 grips the cutting tool 60.

The holder body 10 has a rear hole 11, a middle hole 12, and a front hole 13 in this order from rear to front in the axial direction. The rear hole 11 extends from the rear end of the holder body 10 forward in the axial direction. A pull stud, not shown, is installed in a rear end region of the rear hole 11. The rear hole 11 has a plurality of stepped portions 11*a*, 11*b* in its distal end region, so that the diameter of the distal end region of the rear hole 11 decreases stepwise toward the front side in the axial direction. A tensile bolt 18 and a retaining member 19 are disposed in the rear hole 11. The retaining member 19 is a member for reducing or eliminating the possibility of the tensile bolt 18 slipping out from the rear end of the holder body 10.

The tensile bolt 18 is a bolt for drawing the collet 20, which will be described below, toward the rear end of the holder body 10 and clamping the collet 20. The tensile bolt 18 extends along the axis of the holder body 10 into the middle hole 12 with its head 18*a* located on the rear side in the axial direction and its shaft 18*b* located on the front side in the axial direction. The head 18*a* faces the stepped portion 11*b* of the rear hole 11. The stepped portion 11*b* on the distal end side restricts movement of the tensile bolt 18 toward the front end. The distal end portion of the shaft 18*b* is externally threaded, and is screwed into a draw hole 26 in the rear end portion of the collet 20. A preferred example of the tensile bolt 18 is a draw bolt.

The retaining member 19 is located in the stepped portion 11*a* on the rear end side of the tensile bolt 18. The retaining member 19 is a member for reducing or eliminating the possibility of the tensile bolt 18 slipping out of the holder body 10 when the collet 20 is removed. The retaining member 19 is externally threaded, so that the retaining member 19 engages with an internally threaded portion of the rear hole 11. The retaining member 19 has a hexagonal hole 19*a* that allows rotation of the retaining member 19 itself, and a through hole 19*b* connected to the distal end of the hexagonal hole 19*a* and having a shape with a smaller inner diameter than the hexagonal hole 19*a*. The through hole 19*b* is a hole through which a hexagon wrench for rotating the tensile bolt 18 is inserted.

The middle hole 12 is connected to the front end of the rear hole 11 and extends forward in the axial direction. The inner diameter of the middle hole 12 is larger than that of the rear hole 11, and a boundary wall surface 12*a* is formed at the boundary between the rear hole 11 and the middle hole 12. The boundary wall surface 12*a* is an annular step coaxial with the axis, is a flat surface perpendicular to the axis, and a wall facing forward in the axial direction.

The front hole 13 is a tapered hole connected to the front end of the middle hole 12 and extending forward in the axial direction, and the inner diameter of the front hole 13 gradually increases toward its distal end. These holes 11, 12, and 13 form a through hole extending from the distal end to rear end of the holder body 10.

A flange portion 14 for gripping is formed on the outer periphery of the holder body 10 so as to protrude outward in the radial direction. The flange portion 14 is located on the middle portion in the axial direction the holder body 10 excluding the distal and rear end portions of the holder body 10. A tapered shank portion 15 is formed in an axial rear end region including the rear end portion of the holder body 10. The diameter of the tapered shank portion 15 gradually decreases from the flange portion 14 toward its rear end. The tapered shank portion 15 of the tool holder 1 is mounted in a spindle of a machine tool, not shown.

The holder body 10 has a first through hole 16 connected to a cut 14*a* formed in the flange portion 14. The first through hole 16 extends in the radial direction perpendicular to the axial direction, and extends from the outer peripheral surface of the holder body 10 to the inner peripheral surface of the middle hole 12. The first through hole 16 is internally threaded.

As shown particularly in FIG. 3, the holder body 10 has a second through hole 17 at a different circumferential position from the first through hole 16. Specifically, the holder body 10 has the second through hole 17 on the opposite side of the axis from the first through hole 16. The second through hole 17 is formed radially inward of a cut 14*b* located symmetrically with the cut 14*a* with respect to the axis. The axial position of the second through hole 17 is the same as that of the first through hole 16, but the circumferential position of the second through hole 17 is about 180 degrees away from that of the first through hole 16 about the axis.

As shown in FIG. 2, the second through hole 17 extends from the outer peripheral surface of the holder body 10 to the inner peripheral surface of the middle hole 12 so as to be tilted from front toward rear. In other words, the second through hole 17 is slightly tilted so that its radially outer side is located closer to the distal end in the axial direction of the holder body 10 than its radially inner side. Preferably, the tilt angle is about 5° with respect to the direction perpendicular to the axis of the holder body 10, or is set within the range of 1° to 10° according to the tilt angle of a second flat portion 25 that will be described later.

The collet 20 is detachably inserted into the middle hole 12 and front hole 13 of the holder body 10. The collet 20 has a tapered shape and directly holds the cutting tool 60 that will be described later. The collet 20 will be described in detail with reference to FIGS. 4(A) to 4(C).

The collet 20 includes a rear end region 20A and a front end region 20B with the middle in the axial direction of the collet 20 as a boundary therebetween. The rear end region 20A is located on the rear end side of the collet 20, and the front end region 20B is located on the front end side of the collet 20. A tool insertion hole into which the cutting tool 60 is inserted is formed in the front end region 20B. Namely, an inner peripheral surface 21b of the front end region 20B defines the tool insertion hole. A rear end 60a of the cutting tool 60 is located in the tool insertion hole. As shown in FIG. 2, the outer diameter of an outer peripheral surface 21a of the front end region 20 gradually increases toward its distal end, and the outer peripheral surface 21a contacts the inner peripheral surface of the front hole 13 of the holder body 10. As shown in FIG. 4(A), the inner diameter of the rear end region 20A is slightly larger than that of the front end region 20B, and a very small annular step coaxial with the axis is provided at the boundary between the rear end region 20A and the front end region 20B.

The rear end region 20A includes a first region 27A whose inner peripheral surface is located on the rear end side, and a second region 27B whose inner peripheral surface is located on the front end side. The inner diameter of the first region 27A is smaller than that of the second region 27B. The draw hole 26 that engages with the tensile bolt 18 described above is formed in the first region 27. Namely, the inner peripheral surface of the first region 27A defines the draw hole 26. Specifically, the draw hole 26 is internally threaded so that the externally threaded portion of the shaft 18b of the tensile bolt 18 engages with the draw hole 26. A boundary wall surface 28 facing forward in the axial direction is formed at the boundary between the first region 27A and the second region 27B. The rear end 60a of the cutting tool 60 is located in the second region 27B.

The first region 27A of the rear end region 20A has a first flat portion 24 and a second flat portion 25 that are flat cuts in the outer peripheral surface of the first region 27A. The first flat portion 24 is cut from the rear edge of the collet 20 and extends parallel to the axis. As shown in FIG. 2, the first flat portion 24 is located at a position facing the first through hole 16 described above.

As shown in FIG. 4(B), the collet 20 has a slit 23 extending in the axial direction from the rear end portion of the second region 27B of the rear end region 20A to the front end portion of the front end region 20B. As shown in FIG. 4(C), the collet 20 has a plurality of the slits 23, specifically six slits 23, at equal intervals in the circumferential direction. The diameter of the collet 20 can be reduced by pressing the slits 23 together.

As shown in FIG. 2, the second flat portion 25 is provided at a position facing the second through hole 17 described above. Specifically, the second flat portion 25 is formed on the opposite side of the axis O from the first flat portion 24. The axial position of the second flat portion 25 is the same as that of the first flat portion 24, but the circumferential position of the second flat portion 25 is about 180 degrees away from that of the first flat portion 24 about the axis.

The second flat portion 25 is not parallel to the axis, but is tilted gradually away from the axis from front toward rear. The tilt angle of the second flat portion 25 is about 5° or within the range of 1° to 10° with respect to the axis.

As shown in FIG. 4(A), the collet 20 has a keyway 22 in the front end region 20B. The keyway 22 extends from the outer peripheral surface 21a to the inner peripheral surface (tool insertion hole) 21b of the front end region 21B. A key 50 passes through the keyway 22. As shown in FIG. 2, the key 50 fits in the keyway 22 of the collet 20, contacts the inner peripheral surface of the front hole 13, and contacts a side lock recess 62 of the cutting tool 60 inserted into the tool insertion hole 21b. Hereinafter, the side lock recess 62 will be simply referred to as "recess 62."

Figure 5:
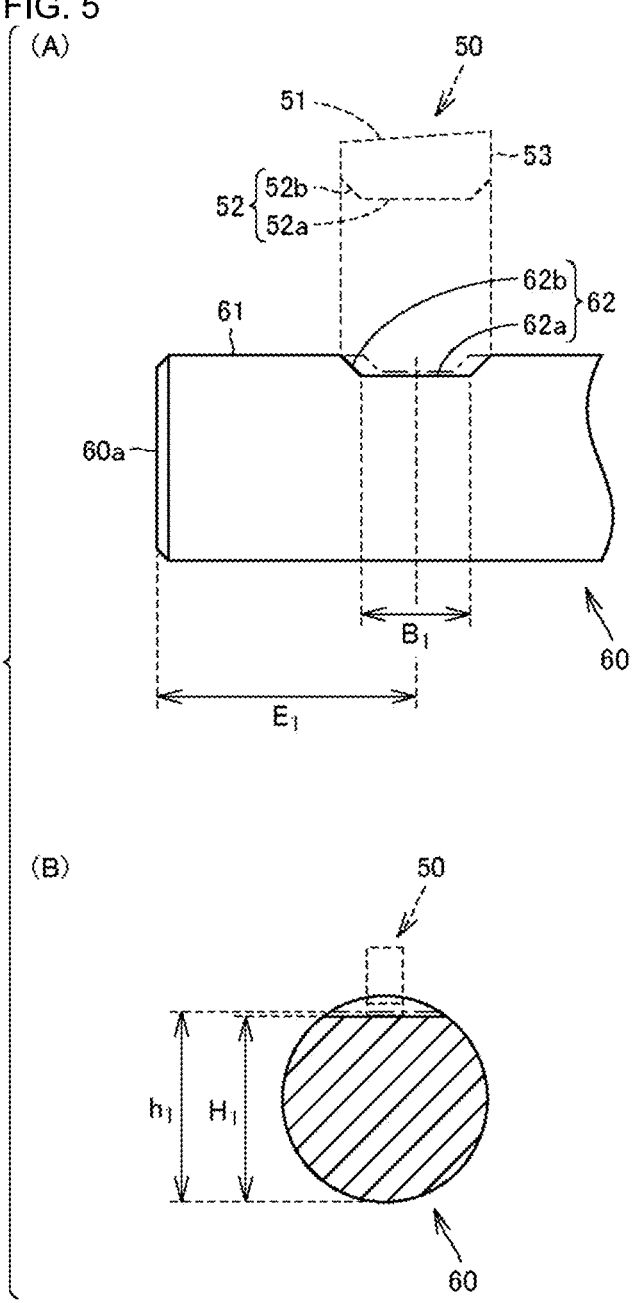
FIG. 5 shows enlarged views of a rear end portion of an additionally machined cutting tool, where

As shown in FIGS. 2 and 5, the key 50 has a three-dimensional shape, and includes an upper surface 51, a lower surface 52, and a side surface 53 connecting the upper surface 51 and the lower surface 52. The upper surface 51 contacts the front hole 13 of the holder body 10, and the lower surface 52 contacts the recess 62 of the cutting tool 60. The upper surface 51 is formed so as to be gradually separated away from the axis from rear toward front. That is, the upper surface 51 is designed to conform to the tilt of the tapered front hole 13 of the holder body 10. The lower surface 52 extends parallel to the axis. Since the upper surface 51 is tilted with respect to the axial direction, the side surface 53 has a greater height at front than at rear. The lower surface 52 includes a bottom surface 52a and a pair of tilted surfaces 52b located so as to be continuous with both axial ends of the bottom surface 52a.

As shown in FIG. 4(B), the keyway 22 is formed at the same position in the radial and circumferential directions as one of the slits 23. Specifically, the keyway 22 is formed at an intermediate position in the axial direction of the slit 23. The keyway 22 is preferably located at a middle position in the axial direction of the front end region 20B. The keyway 22 and the first flat portion 24 are located at such positions that they overlap each other in the axial direction.

As shown particularly in FIG. 2, a first side lock bolt 30 passes through the first through hole 16 of the holder body 10. The distal end of the first side lock bolt 30 contacts the first flat portion 24 of the collet 20. The first side lock bolt 30 is typically a bolt, and its shaft is externally threaded. The first side lock bolt 30 is screwed into the internally threaded first through hole 16, and is tightened or loosened.

As the first side lock bolt 30 is rotated and tightened, the distal end portion of the first side lock bolt 30 advances radially inward and presses the first flat portion 24 of the collet 20. Such side locking with the first side lock bolt 30 can prevent movement of the collet 20 in the rotation direction. The collet 20 can thus be locked by the side lock type chuck structure.

As shown in FIG. 2, a second side lock bolt 40 passes through the second through hole 17 of the holder body 10. The distal end of the second side lock bolt 40 contacts the second flat portion 25 of the collet 20. The second side lock bolt 40 includes a bolt body 41 that passes through the second through hole 17, and a contact portion 42 that contacts the second flat portion 25 of the collet 20.

A shaft of the bolt body 41 is externally threaded. The contact portion 42 is provided so that its orientation can change according to the orientation of the second flat portion 25. Specifically, as shown in FIG. 3, the contact portion 42 is supported by a spherical surface of the bolt body 41. Therefore, the contact portion 42 can rotate about the central axis of the bolt body 41 and can also be tilted with respect to the central axis of the bolt body 41.

Therefore, the contact portion 42 can freely change its orientation with respect to the bolt body 41. The contact portion 42 may be attached to the bolt body 41 by any method that allows the contact portion 42 to freely change its orientation with respect to the bolt body 41, such as a universal joint. Since the contact portion 42 is universally movable, the collet 20 can be firmly fixed according to the orientation of the second flat portion 25. By providing the second side lock bolt 40 in addition to the first side lock bolt 30, movement of the collet 20 in the rotation direction can further be prevented, which makes it possible to use the tool holder 1 for ultra-cutting.

The cutting tool 60 is inserted into the tool insertion hole 21*b* of the collet 20. As shown in FIG. 5, the cutting tool 60 is a single-piece tool composed of a shank portion 61 and a blade portion for performing cutting (blade shape is not shown). The shank portion 61 includes the recess 62 formed at a position facing the keyway 22 of the collet 20.

The recess 62 is cut in a direction perpendicular to the axis. The recess 62 into which the key 50 fits includes a bottom surface 62*a* and a pair of tilted surfaces 62*b* continuous with the front and rear ends of the bottom surface 62*a* in the axial direction. The key 50 described above contacts the recess 62 from above. Specifically, the bottom surface 52*a* of the key 50 closely contacts the bottom surface 62*a* of the recess 62, and the tilted surfaces 52*b* of the key 50 closely contact the pair of tilted surfaces 62*b* of the recess 62.

The cutting tool 60 that is used with the tool holder 1 of the present embodiment is, for example, a cutting tool whose shank portion already has a recess. Such a shank is commonly called Weldon shank and is defined by an international standard such as DIN 1835 Form B. The cutting tool 60 that is used with the tool holder 1 of the present embodiment is a cutting tool whose recess 162 of a Weldon shank, which is a standard shank product, has been additionally machined.

Figure 6:
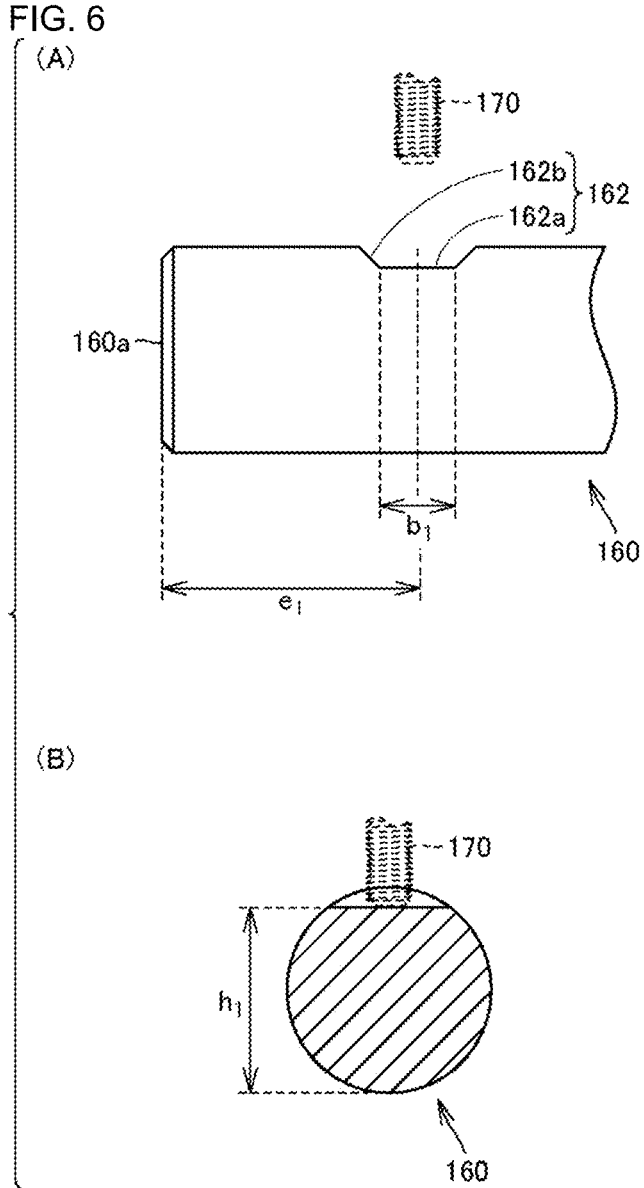
FIG. 6 shows enlarged views of a rear end portion of a cutting tool before the additional machining, where
Figure 7:
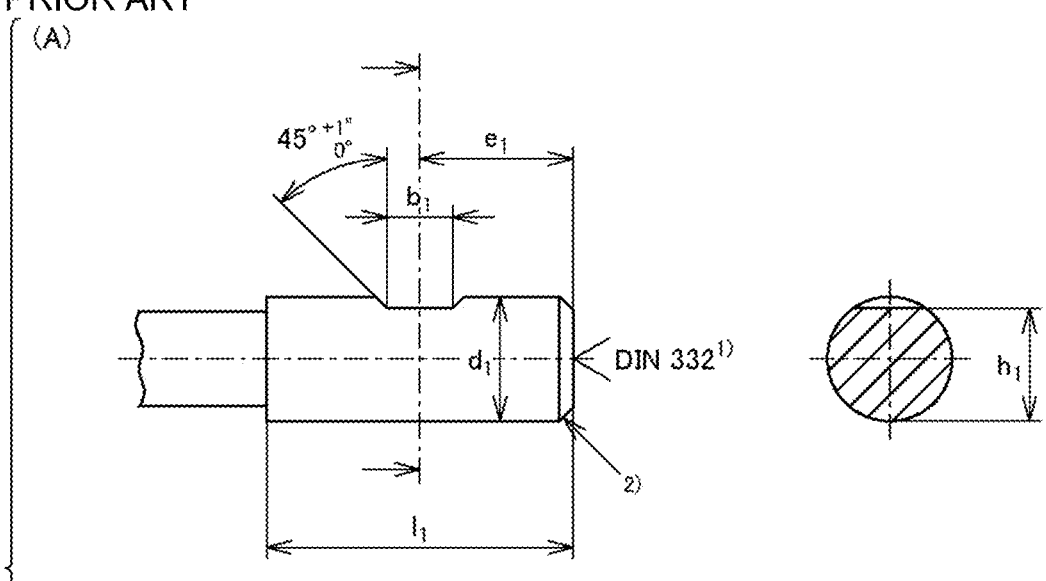
FIG. 7 shows a DIN standard, DIN 1835 Form B, where

As shown in FIGS. 6 and 7, a cutting tool 160 with a standard shank will be described. FIGS. 6 and 7 show the cutting tool 160 before the additional machining, that is, a standard shank product. FIG. 7(A) show side and front views of the standard shank product, and FIG. 7(B) is a table of the shank standard. The standard shank product is defined as follows: the tolerance of the axial length $e_1$ from a rear end 160*a* of the cutting tool 160 to the middle of the recess 162 is within the range of 0 to −1, the tolerance of the axial length $b_1$ of the recess 162 is within the range of 0 to +0.05, and the value $h_1$ obtained by subtracting the length in the depth direction of the recess 162 from the shank diameter $d_1$ is $h_{13}$, where $h_{13}$ is a fitting symbol in a fitting tolerance standard (ISO 286-2, DIN 7154, DIN 7155). As an example, when the shank diameter $d_1=\varphi 20$, the tolerance $h_{13}$ of the value $h_1$ obtained by subtracting the length in the depth direction of the recess 162 from the shank diameter $d_1$ is 0 to −0.33.

As shown in FIG. 6, the cutting tool 160 has the recess 162 on its outer peripheral surface. The recess 162 includes a bottom surface 162*a* and a pair of tilted surfaces 162*b* continuous with the front and rear ends of the bottom surface 162*a* in the axial direction. For example, the conventional cutting tool 160 is fixed and gripped by the distal end of a lock bolt 170 contacting the bottom surface 162*a* of the recess 170.

However, within these tolerance ranges before the additional machining, the tolerances of $b_1$ and $h_1$ are large. The inventors found through intensive studies that, due to these large tolerances of $b_1$ and $h_1$, the cutting tool 160 moves in the axial direction during ultra-cutting even if the cutting tool 160 is side-locked with two side lock bolts (first side lock bolt 30 and second side lock bolt 40) via the collet 20. As a solution to this problem, the inventors additionally machined the recess 162 of the cutting tool 160 into the recess 62 having a greater axial length and a greater depth toward the central axis and also reduced the tolerances of the axial length and the depth toward the central axis to very small values. Specifically, as shown in FIG. 5, the tolerance of the axial length $b_1$ of the recess 62 is within the range of 0 to +0.005, and the value $h_1$ obtained by subtracting the length in the depth direction of the recess 62 from the shank diameter $d_1$ is within the range of 0 to −0.005. In FIG. 5, the shape of the recess before the additional machining is shown by a long dashed short dashed line, $H_1$ represents $h_1$ after the additional machining, $B_1$ represents $b_1$ after the additional machining, and $E_1$ represents $e_1$ after the additional machining. The tolerances of $H_1$ and $B_1$ after the additional machining are much smaller than the tolerances of $h_1$ and $b_1$ before the additional machining. Note that whether the tolerance of $E_1$ is smaller than the tolerance of $e_1$ varies depending on the product.

In a tool holding structure including the tool holder 1 and the cutting tool 60 of the present embodiment, the tolerance of the axial length $b_1$ of the recess 62 of the cutting tool 60 is within the range of 0 to +0.005, and the value $h_1$ obtained by subtracting the length in the depth direction of the recess 62 from the shank diameter $d_1$ is within the range of 0 to −0.005. This allows the lower surface 52 of the key 50 to fit on the bottom surface of the recess 62 of the cutting tool 60 with no gap therebetween. It is therefore possible to prevent movement of the cutting tool 60 in the axial direction during ultra-cutting and thus hold the cutting tool 60 reliably and stably.

The tool holder 1 of the present embodiment supports the cutting tool 60 in the holder body 10 via the collet 20. Specifically, the cutting tool 60 and the collet 20 are engaged at two positions: the key 50 and the tensile bolt 18. Furthermore, the collet 20 and the holder body 10 are engaged at two positions: the first side lock bolt 30 and the second side lock bolt 40. It is therefore possible to hold the cutting tool 60 reliably and stably even when ultra-cutting is performed using the tool holder 1.

Second Embodiment

Figure 8:
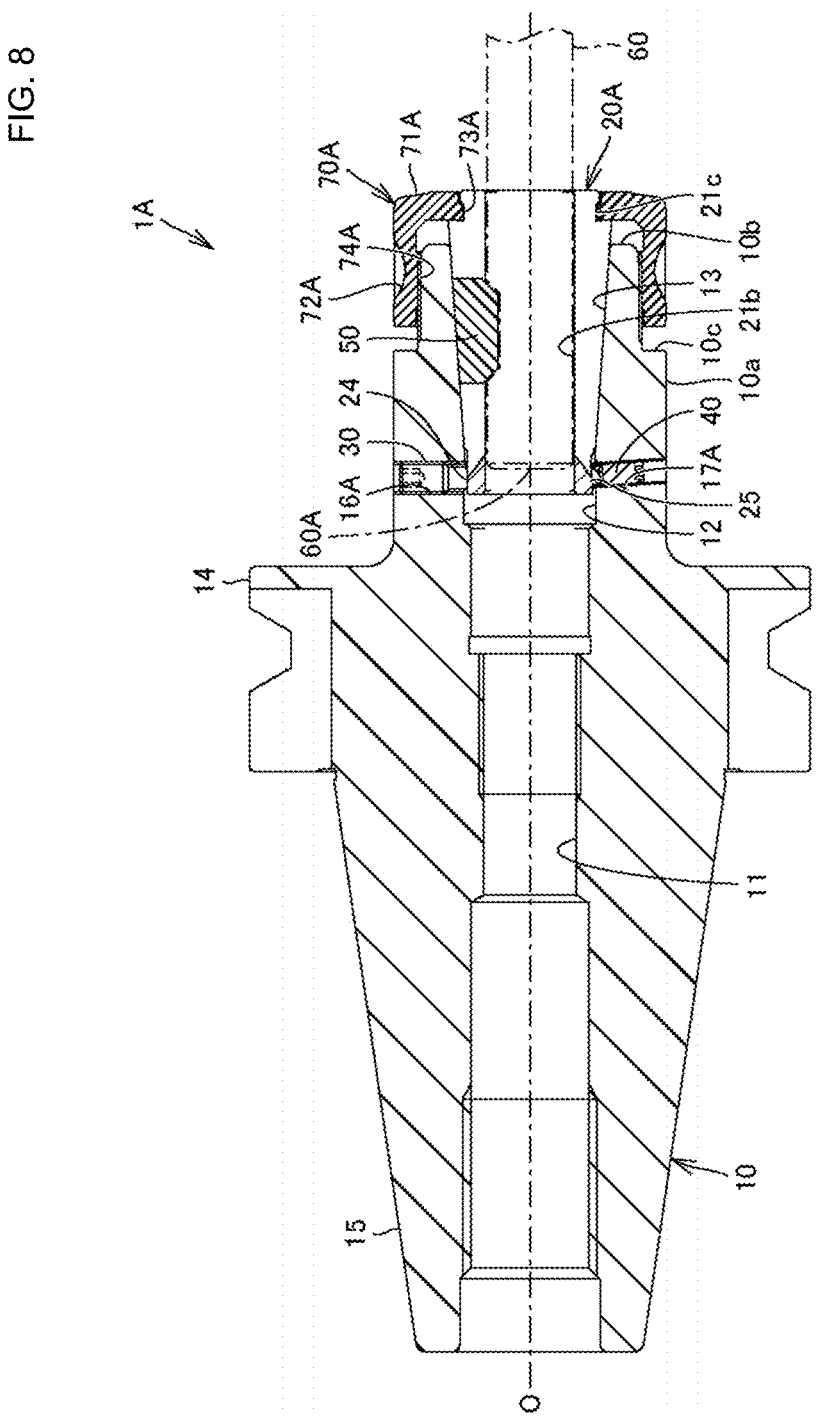
FIG. 8 is a side view of a tool holder according to a second embodiment of the present invention.
Figure 9:
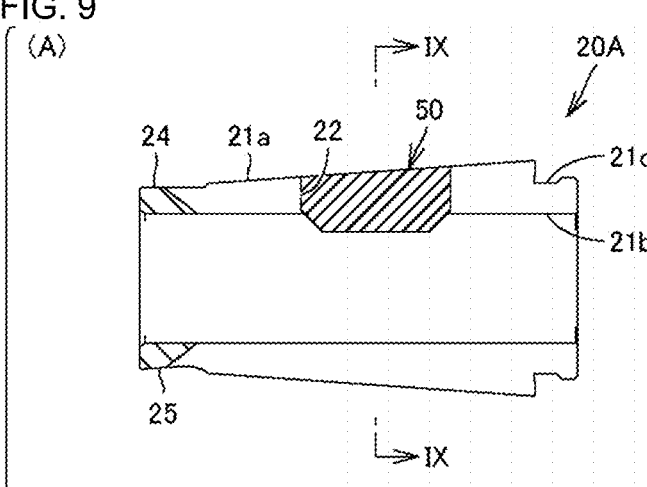
FIG. 9 shows a collet alone, where
Figure 9:
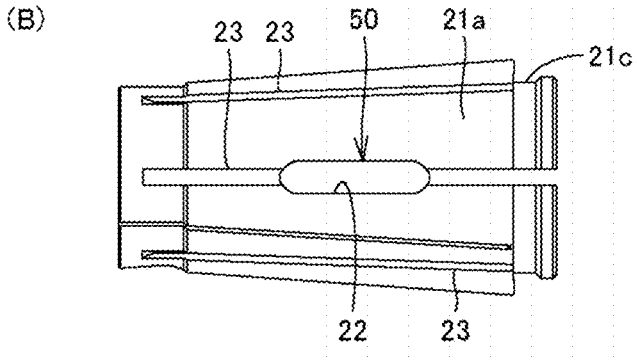
Figure 9:
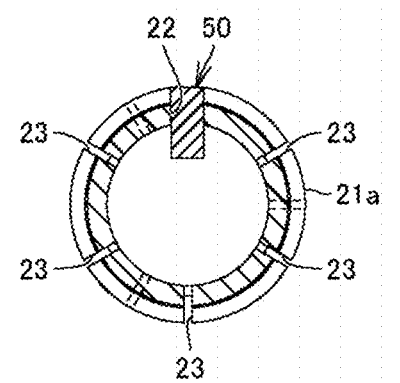

FIG. 8 is a side view of a tool holder according to a second embodiment of the present invention, and FIG. 9 shows a collet that is used for the tool holder. A tool holder 1A according to the second embodiment will be described with reference to FIGS. 8 and 9. In the first embodiment, the collet 20 is drawn and fixed by the tensile bolt 18. The second embodiment is different from the first embodiment in that the tensile bolt 18 is not provided and a collet 20A is fixed by a tightening nut 70A provided at its distal end portion. Only the differences from the structure shown in the first embodiment will be described in detail below.

As shown in FIG. 8, the holder body 10 includes a rear region 10*a* having a large outer diameter and a front region 10*b* having a smaller outer diameter than the rear region 10*a*. The rear region 10*a* and the front region 10*b* are located forward of the flange portion 14, and a stepped portion 10*c* is provided at the boundary between the rear region 10*a* and the front region 10*b*. A first through hole 16A and a second through hole 17A are formed in the rear region 10*a*. That is, the first through hole 16A and the second through hole 17A are formed at positions closer to the distal end of the holder body 10 than the flange portion 14. A groove into which the tightening nut 70A, which will be described later, is screwed is formed in the outer peripheral surface of the rear region 10*b*.

As shown in FIG. 9, the collet 20A of the present embodiment does not have the draw hole 26 of the first embodiment, but extends straight so as to conform to the outer peripheral surface of the cutting tool 60. As shown in FIG. 8, with the cutting tool 60 gripped by the collet 20A, a rear end 60*a* of the cutting tool 60 is located at the radial position of the first and second flat portions 24, 25. The collet 20A has a recess 21*c* in a portion protruding forward from the distal edge of the holder body 10.

As shown in FIG. 8, the tightening nut 70A is tightened in the recess 21*c* of the collet 20A. The tightening nut 70A has a tubular shape, and includes a standing wall portion 71A and a side wall portion 72A extending from the standing wall portion 71A along the distal end portion of the holder body 10. The inner peripheral surface of the standing wall portion 71A is fitted in the recess 21*c* of the collet 20A, and the inner peripheral surface of the side wall portion 72A is screwed on the outer peripheral surface of the distal end portion of the holder body 10. The collet 20A can be firmly fixed to the holder body 10 by the tightening nut 70A.

In the tool holder 1 of the first embodiment described above, the cutting tool 60 and the collet 20 are engaged at two positions: the key 50 and the tensile bolt 18, and the collet 20 and the holder body 10 are engaged at two positions: the first side lock bolt 30 and the second side lock bolt 40. However, the cutting tool 60 and the collet 20 need only be engaged via at least the key 50.

Although the embodiments of the present invention are described above with reference to the drawings, the present invention is not limited to the illustrated embodiments. Various modifications and variations can be made to the illustrated embodiments within the same scope as, or within a scope equivalent to, the present invention.

The present invention is advantageously used in machine tools.

The invention claimed is:

1. A tool holder for fixing and grasping a cutting tool having a shank with a side lock recess, the tool holder comprising:
    a holder body including a rear hole, a middle hole, a front hole, a first through hole, and a second through hole, the rear hole extending from a rear end of the holder body forward in an axial direction, the middle hole being connected to a front end of the rear hole and extending forward in the axial direction, the front hole being a tapered hole connected to a front end of the middle hole and extending forward in the axial direction with an inner diameter of the tapered hole gradually increasing toward a distal end of the holder body, the first through hole extending perpendicularly to the axial direction from an outer peripheral surface of the holder body to an inner peripheral surface of the middle hole, and the second through hole being located at a different position in a circumferential direction from the first through hole and extending from the outer peripheral surface of the holder body to the inner peripheral surface of the middle hole so as to be tilted with respect to the axial direction;
    a tapered collet that is detachably inserted into the middle hole and the front hole, that includes a tool insertion hole in a distal end region of the collet, and in which an outer diameter of an outer peripheral surface of the collet gradually increases toward a distal end of the collet, the collet including a keyway, a first flat portion, and a second flat portion, the keyway extending from the outer peripheral surface of the tapered collet to the tool insertion hole, the first flat portion being a flat cut in the outer peripheral surface of the collet and located at a position facing the first through hole, and the second flat portion being a flat cut in the outer peripheral surface of the collet that is tilted with respect to the axial direction and being located at a position facing the second through hole;
    a first side lock bolt that passes through the first through hole and whose distal end contacts the first flat portion of the collet;
    a second side lock bolt that passes through the second through hole and whose distal end contacts the second flat portion of the collet; and
    a key that fits in the keyway of the collet, contacts an inner peripheral surface of the front hole, and contacts the side lock recess of the cutting tool inserted into the tool insertion hole.

2. The tool holder according to claim 1, wherein
    the collet includes a rear end region and a front end region with a middle in the axial direction as a boundary between the rear end region and the front end region, the rear end region being located on a rear end side, and the front end region being located on a front end side, and
    the keyway is located in the front end region.

3. The tool holder according to claim 1, wherein
    the collet includes a plurality of slits extending in the axial direction, and
    the keyway is located at an intermediate position in the axial direction of one of the slits.

4. The tool holder according to claim 1, wherein
    the keyway and the first flat portion of the collet are located at such positions that the keyway and the first flat portion overlap each other in the axial direction.

5. The tool holder according to claim 1, wherein
    the second side lock bolt includes a bolt body that passes through the second through hole, and a contact portion that contacts the second flat portion of the collet, and
    the contact portion is provided in such a manner that an orientation of the contact portion is changeable according to an orientation of the second flat portion.

6. The tool holder according to claim 1, wherein
    the collet includes an engaging portion along a rear inner peripheral surface in the axial direction, the engaging portion being a portion that engages with a tensile bolt.

7. A tool holding structure, comprising:
    a cutting tool having a shank with a side lock recess; and
    a tool holder comprising:
    a holder body including a rear hole, a middle hole, a front hole, a first through hole, and a second through hole, the rear hole extending from a rear end of the holder body forward in an axial direction, the middle hole being connected to a front end of the rear hole and extending forward in the axial direction, the front hole being a tapered hole connected to a front end of the middle hole and extending forward in the axial direction with an inner diameter of the tapered hole gradually increasing toward a distal end of the holder body, the first through hole extending perpendicularly to the axial direction from an outer peripheral surface of the holder body to an inner peripheral surface of the middle hole, and the second through hole being located at a different position in a circumferential direction from the first through hole and extending from the outer peripheral surface of the holder body to the inner peripheral surface of the middle hole so as to be tilted with respect to the axial direction;

a tapered collet that is detachably inserted into the middle hole and the front hole, that includes a tool insertion hole in a distal end region of the collet, and in which an outer diameter of an outer peripheral surface of the collet gradually increases toward a distal end of the collet, the collet including a keyway, a first flat portion, and a second flat portion, the keyway extending from the outer peripheral surface of the tapered collet to the tool insertion hole, the first flat portion being a flat cut in the outer peripheral surface of the collet and located at a position facing the first through hole, and the second flat portion being a flat cut in the outer peripheral surface of the collet that is tilted with respect to the axial direction and being located at a position facing the second through hole;

a first side lock bolt that passes through the first through hole and whose distal end contacts the first flat portion of the collet;

a second side lock bolt that passes through the second through hole and whose distal end contacts the second flat portion of the collet; and a key that fits in the keyway of the collet, contacts an inner peripheral surface of the front hole, and contacts the side lock recess of the cutting tool in a state in which the cutting tool is inserted into the tool insertion hole, wherein the cutting tool is inserted into the tool insertion hole of the collet, and the side lock recess is located at a position facing the keyway of the collet and into which the key fits.

8. The tool holding structure according to claim 7, wherein a tolerance of an axial length of the side lock recess is within a range of 0 to +0.005.

* * * * *